(12) United States Patent
Cox et al.

(10) Patent No.: US 7,752,317 B1
(45) Date of Patent: Jul. 6, 2010

(54) WORKSTATION VIRUS LOCKDOWN IN A DISTRIBUTION ENVIRONMENT

(75) Inventors: Richard H. Cox, Orem, UT (US); David Beus, Highland, UT (US); Brad R. Anderson, Provo, UT (US); Edward S. Haeger, Park City, UT (US); Martin Buckley, Sherwood (GB)

(73) Assignee: Novell, Inc., Provo, UT (US)

( * ) Notice: Subject to any disclaimer, the term of this patent is extended or adjusted under 35 U.S.C. 154(b) by 1577 days.

(21) Appl. No.: 10/206,627

(22) Filed: Jul. 29, 2002

(51) Int. Cl.
*G06F 15/16* (2006.01)

(52) U.S. Cl. .............. 709/229; 709/223; 709/224; 709/225; 709/227; 726/3; 726/4; 726/24; 726/25

(58) Field of Classification Search ......... 709/217–229; 726/22–27, 1–6
See application file for complete search history.

(56) References Cited

U.S. PATENT DOCUMENTS

| | | | | |
|---|---|---|---|---|
| 5,121,345 A * | 6/1992 | Lentz | ............ | 713/188 |
| 5,421,009 A * | 5/1995 | Platt | ............ | 709/221 |
| 5,452,454 A * | 9/1995 | Basu | ............ | 713/2 |
| 5,680,547 A * | 10/1997 | Chang | ............ | 709/222 |
| 5,802,277 A * | 9/1998 | Cowlard | ............ | 726/22 |
| 6,202,091 B1 * | 3/2001 | Godse | ............ | 709/222 |
| 6,266,809 B1 * | 7/2001 | Craig et al. | ............ | 717/173 |
| 6,269,456 B1 * | 7/2001 | Hodges et al. | ............ | 714/38 |
| 6,421,777 B1 * | 7/2002 | Pierre-Louis et al. | ............ | 713/2 |
| 6,446,203 B1 * | 9/2002 | Aguilar et al. | ............ | 713/2 |
| 6,463,474 B1 * | 10/2002 | Fuh et al. | ............ | 709/225 |
| 6,792,474 B1 * | 9/2004 | Hopprich et al. | ............ | 709/245 |
| 7,007,077 B1 * | 2/2006 | Shinohara et al. | ............ | 709/220 |
| 7,549,055 B2 * | 6/2009 | Zimmer et al. | ............ | 713/2 |
| 2002/0199116 A1 * | 12/2002 | Hoene et al. | ............ | 713/201 |
| 2003/0055962 A1 * | 3/2003 | Freund et al. | ............ | 709/225 |
| 2003/0163702 A1 * | 8/2003 | Vigue et al. | ............ | 713/176 |
| 2004/0236960 A1 * | 11/2004 | Zimmer et al. | ............ | 713/200 |
| 2005/0216759 A1 * | 9/2005 | Rothman et al. | ............ | 713/200 |

* cited by examiner

*Primary Examiner*—Joseph Thomas
*Assistant Examiner*—Brendan Higa
(74) *Attorney, Agent, or Firm*—Pillsbury Winthrop Shaw Pittman LLP

(57) ABSTRACT

Systems and methods for insuring that a client computer has up-to-date virus protection are provided, and include initiating a boot sequence pursuant to a boot image on a client computer for accessing a network, accessing a remote management server according to a preliminary instruction from the boot image, determining whether the client includes a latest virus file and forwarding the latest virus file if the client does not include the latest virus file.

31 Claims, 6 Drawing Sheets

WORKSTATION VIRUS LOCKDOWN IN A DISTRIBUTION ENVIRONMENT

BACKGROUND OF THE INVENTION

1. Field of the Invention

This invention relates to a process and apparatus for protecting a computer network from viruses, and more particularly, the present invention is directed to systems and methods for providing a latest virus software to a workstation (client) upon booting up the workstation.

2. The Prior Art

Since the advent of network computing, in particular over the last several years, computers have become prone to infections by viruses. This is especially true for networked computers which often obtain the viruses from the network to which it is communication with.

Although virus software programs exist for scanning a computer to determine if the computer contains a virus, the virus software is often outdated in that it does not contain data related to the most recently discovered viruses. Thus, even if the virus software is operated prior to the computer gaining access to a computer network, it may still be contaminated and be able to spread the virus to other computers on the network.

Thus, there exists a need for a method and system for insuring the a computer includes the most recent virus software. Moreover, there also exists the need for a system and a method for insuring that a client computer has performed a local virus scan using the latest virus data prior to gaining access to a computer network.

SUMMARY OF THE INVENTION

Accordingly, in a first aspect of the present invention, a method for insuring that a client computer has up-to-date virus protection includes initiating a boot sequence pursuant to a boot image on a client computer for accessing a network, accessing a remote management server according to a preliminary instruction from the boot image, determining whether the client includes a latest virus file and forwarding the latest virus file if the client does not include the latest virus file.

In yet another aspect of the present invention, a computer program product for insuring that a client computer has up-to-date virus protection is provided. The computer program product is embodied in one or more computer readable mediums and includes computer instructions carrying out the above recited aspect.

In yet another aspect of the present invention, a system for insuring that a client computer has up-to-date virus protection includes initiating means for initiating a boot sequence pursuant to a boot image on a client computer for accessing a network, accessing means for accessing a remote management server according to a preliminary instruction from the boot image, determining means for determining whether the client includes a latest virus pattern file and forwarding means for forwarding the latest virus pattern file if the client does not include the latest virus pattern file.

These and other objects, features, and advantages of the invention will be apparent through the detailed description of the embodiments and the drawings attached hereto. It is also to be understood that both the foregoing general description and the following detailed description are exemplary and not restrictive of the scope of the invention.

BRIEF DESCRIPTIONS OF THE DRAWINGS

Numerous other objects, features and advantages of the invention should now become apparent upon a reading of the following detailed description when taken in conjunction with the accompanying drawings, in which.

DETAILED DESCRIPTION OF THE EMBODIMENTS

Figure 1:
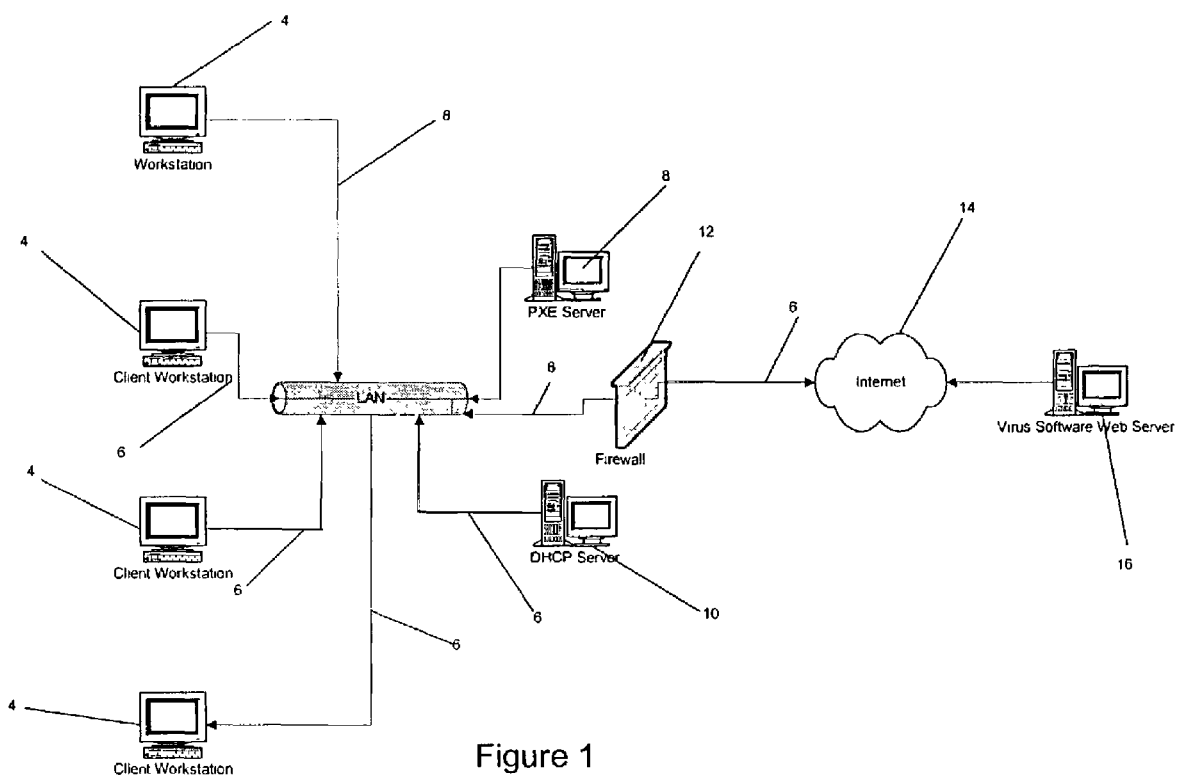
FIG. 1 illustrates a workstation virus lockdown system in a distributed environment according to an embodiment of the present invention.

As shown in FIG. 1, the present invention is used in conjunction with, for example, a Local Area Network (LAN) 2. Accordingly, a plurality of client-workstations computers 4 are in communication with the LAN via communication channels 6. The communication channels may include at least one or several forms of available data transfer including wire cable, optical cable, and wireless technologies. Thus, one workstation may be connected via wireless data transfer, and another device of the network (e.g., a server) may be connected via an optical transfer means, for example.

The LAN includes (at least) a management server 8 over the communication channels, such as, for example a PXE server, in accordance with WfM by Intel® (wired for management) the open-industry specification that allows information technology (IT) professionals to automate client-PC management over a network. Accordingly, Intel'*i* s® WfM specification (Wired For Management Baseline Version 2.0 and associated upgrades) as well Intel's® Pre-Boot Execution Environment (PXE) Version 2.1, are herein incorporated by reference.

The PXE server manages the pre-boot, execution environment for the workstations and may be combined with the other servers connected to the internet. For illustration purposes, however, the PXE server will be illustrated and explained in combination with other features of the present invention as a separate server.

The LAN also is in communication with a Dynamic Host Configuration Protocol server (DHCP) server 10 which assigns IP addresses to devices on the LAN. As with the PXE server, the DHCP server may also be incorporated with another server on the network, but, for illustration purposes, will be included as a separate device. The DHCP server performs dynamic addressing which simplifies network administration because the IP addresses are automatically tracked rather than requiring an administrator to handle the task. Thus, a new computer can be added to a network without the hassle of manually assigning it a unique IP address.

The LAN may also be connected (generally) to the internet 14 via firewall 12 for accessing a remote server(s) 16. For illustration purposes, the remote server is referred to as a virus software web-server where a client may reach to in order to obtain virus application programming as well as up-to-date virus pattern files for use in scanning for recently discovered viruses.

Each workstation in the present invention includes a boot-image containing instructions for getting the client computer up and running when started. Specifically, booting is the process by which software (usually the operating system) is loaded into the memory of a computer and begins execution. Booting may also include loading a software image and starting software instances such as accounting or mail programs/daemons.

Although most PCs, for example, are able to boot their operating system from a disk containing the required booting software, the present invention may operate according to a network organization method which boot from the network using a connection protocol. Such a protocol may be the TCP/IP protocol suite (as used herein for illustration only).

This organization structure allows the client computers to boot in cooperation with the PXE server. Thus, the operating and application programs to be executed and run on the client may either be obtained from the PXE server or locally at the client. The organization structure also allows for alternate instructions to be obtain in accordance with predetermined parameters from the PXE server. In these systems the elements of the TCP/IP protocol suite is generally fetched from the PXE server.

In a typical system, when a computer is first turned on, code present in a boot memory is executed. Typically, this code directs the computer to check for hardware components to ensure no essential components are lacking in the system. The boot memory code then proceeds in loading up the operating system software.

Figure 2:
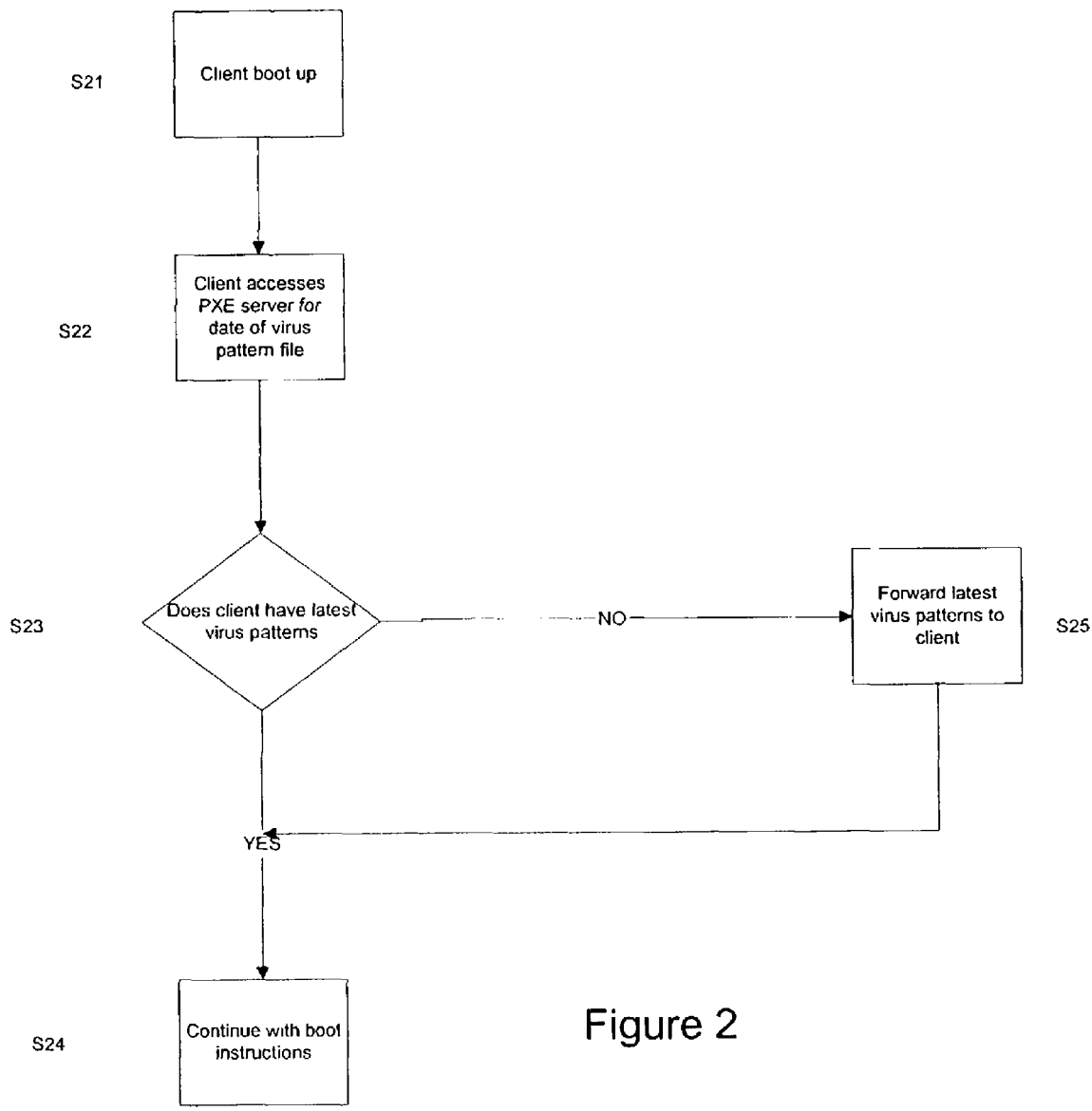
FIG. 2 illustrates a method for a workstation virus lockdown in a distributed environment according to an embodiment of the present invention.

According to one embodiment of the present invention, as shown in FIG. 2, when the client is booted up (S21), the client first communicates with the PXE server prior to performing the virus scan (S22). The date of the locally stored virus pattern file and the date of a virus pattern file on the PXE server are compared (S23) to determine if the client virus pattern file is the very latest file available on the network, so that the latest virus information is available for use in performing a virus scan. If the date of the client virus pattern file is earlier than the date of the virus pattern file on the PXE server, the PXE server virus pattern file is forwarded to the client for use in scanning the client (S25). If the client already has the latest file, the client continues with the boot process (S24).

Figure 3:
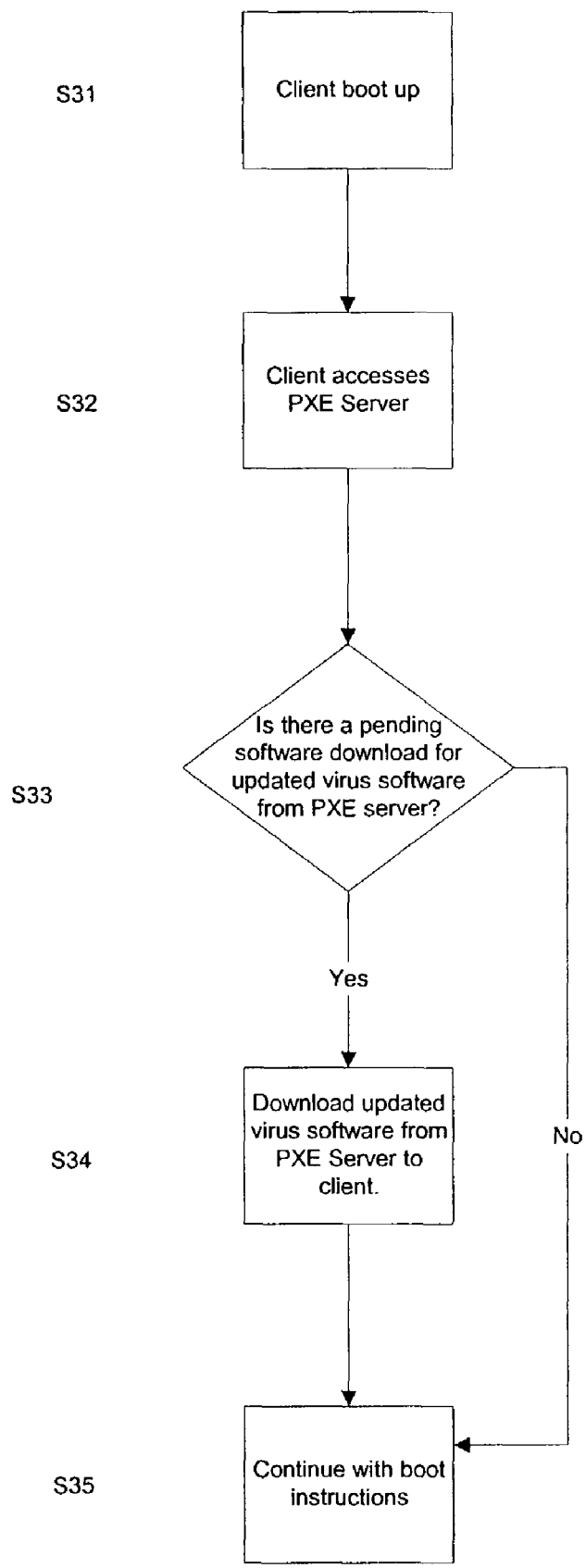
FIG. 3 illustrates another method for a workstation virus lockdown in a distributed environment according to another embodiment of the present invention.

Alternatively, as shown in FIG. 3, the client is booted up (S31) and the PXE server is accessed (S32). Then, instead of comparing the date of the virus pattern files as in FIG. 2, the client communicates with the PXE server to determine if there is a pending event for downloading a virus pattern file (S33). If there is such an event, the virus pattern file is then forwarded (or downloaded) to the client (S34-S35). Otherwise, the boot process continues (S35).

Figure 4A:
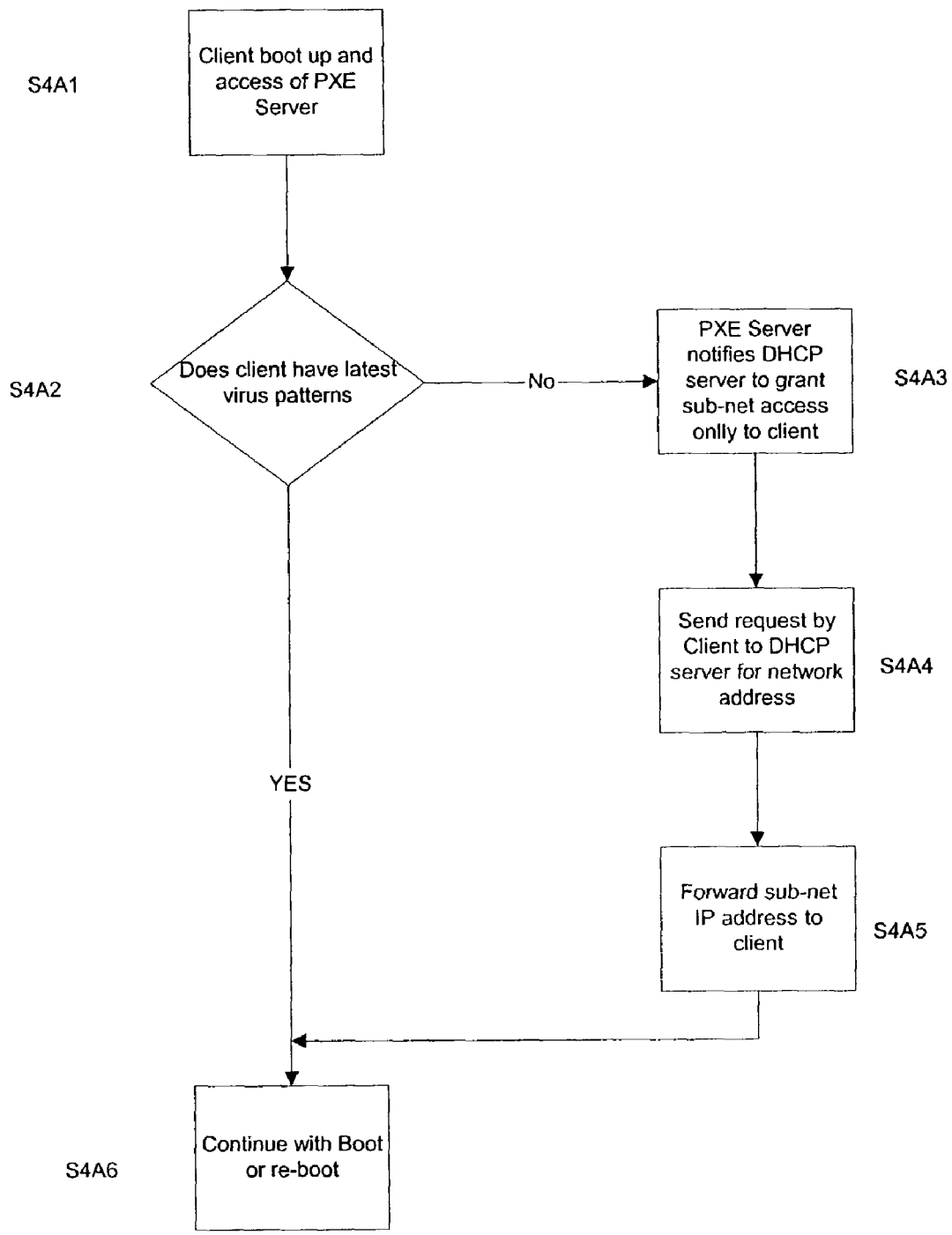
FIG. 4A illustrates another method for a workstation virus lockdown in a distributed environment according to another embodiment of the present invention.

FIG. 4A illustrates an alternate embodiment of the present invention. In this case, the client is booted and the PXE server accessed (S4A1), and when it is determined that the client does not have a latest version of the virus pattern file (S4A2), the PXE server notifies the DHCP server to grant a restricted sub-net address to the client (S4A3). The sub-net address is an address which allows the client to access limited resources. For example, the limited resources may deny access by the client to the LAN, allowing internet only access to the client, allowing access to a virus software server only (either on the LAN or via the internet, for example) to obtain the latest virus software by download and the like, and other limited access resources. Thus, when a request is sent by the client to the DHCP server for an address (S4A4), a sub-net address is returned to the client (S4A5), and the boot process is continued (S4A6).

Figure 4B:
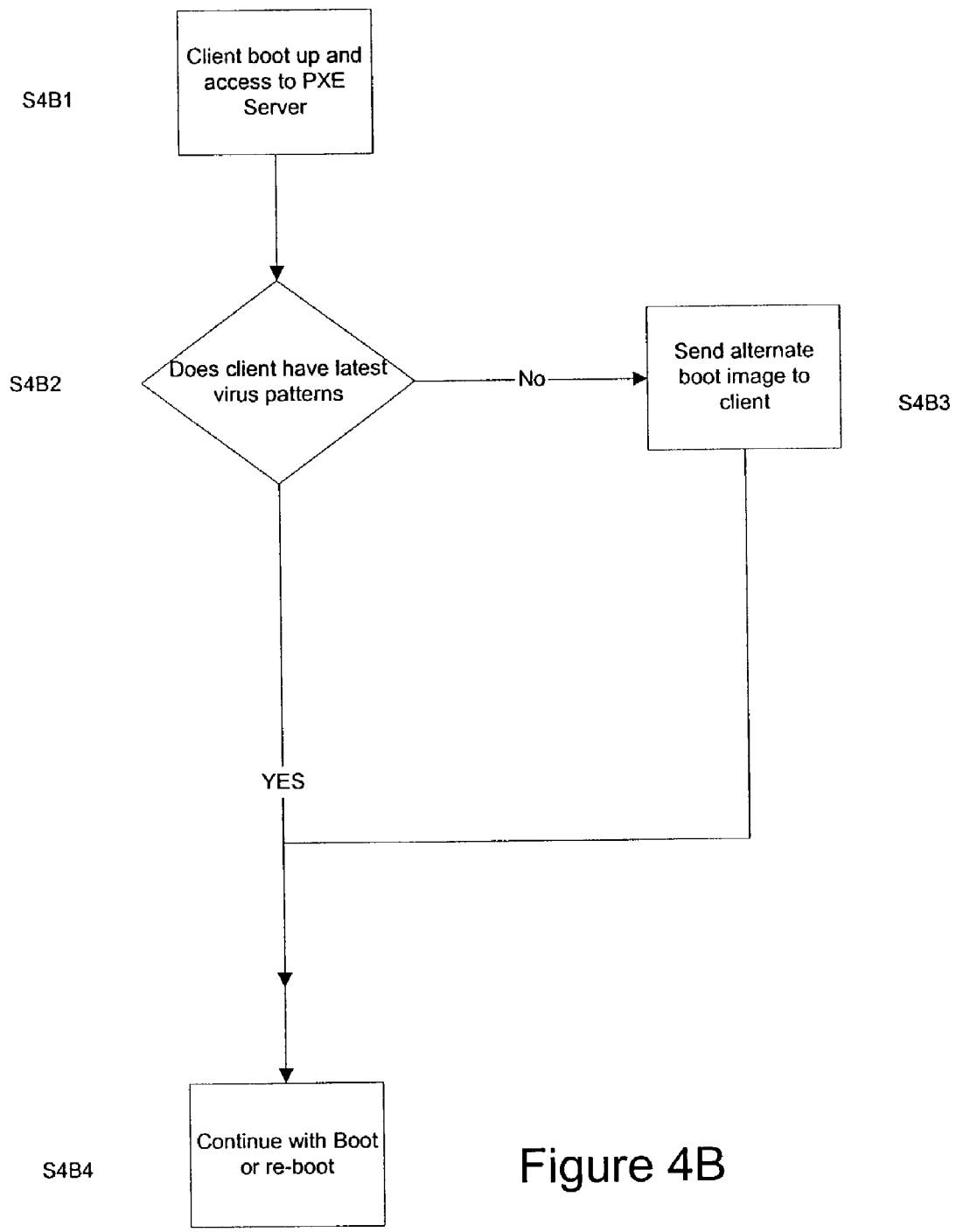
FIG. 4B illustrates another method for a workstation virus lockdown in a distributed environment according to yet another embodiment of the present invention.

Alternatively, as shown in FIG. 4B, the client is booted and the PXE server accessed (S4B1) then the date of the virus pattern file is checked (S4B2). If the client does not have the latest virus software, the client may be forwarded an alternate boot image or partial boot image, having alternative boot instructions which limits the client's access to the LAN (S4B3-S4B4). Specifically, the alternate boot image may, for example, load a web-page via browser software, that enables the client to download (via a link or via an automatic download) the latest virus software. One skilled in the art will appreciate, that the virus software may be a virus engine application, a virus pattern file, or both (for any embodiment of the present invention).

In any of the above embodiments, once the client computer obtains the latest virus software (either application, pattern file or both), the client may (in accordance with boot image instructions) run the virus software and scan the client for viruses and then proceed to gain access to the LAN, and may also re-boot itself to scan for viruses.

Figure 5:
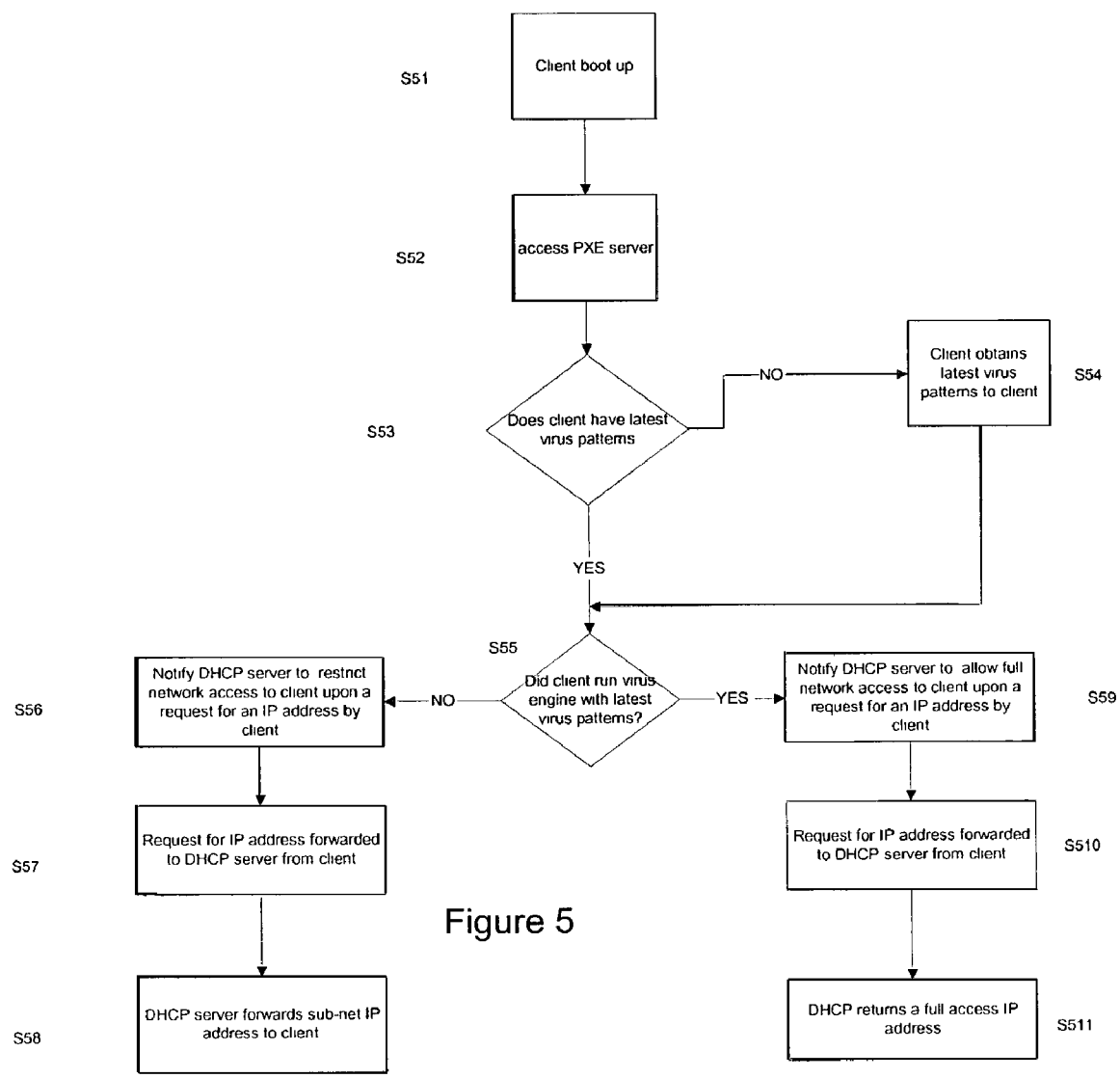
FIG. 5 illustrates another method for a workstation virus lockdown in a distributed environment according to still yet another embodiment of the present invention.

FIG. 5 illustrates another embodiment of the present invention. The client upon boot up (S51), accesses the PXE server (S52). It is then determined whether the client has the latest virus software locally (S53). If the client does not have the latest virus software, the client obtains the software in accordance with the above embodiments, for example (S54). Accordingly, it is then determined if the client has performed a virus scan with the latest version of the virus software within a pre defined acceptable time window (S55). If the client has run the software, then the DHCP server is notified by the PXE server to grant a full network access by the client. Thus, when the client requests an IP address from the DHCP server, the DHCP server forwards a full IP net address to the client (S59-S511).

However, if the client has not run the virus software, then the PXE server notifies the DHCP server to granted a restricted (or sub-net) address to the client. Accordingly, when the client sends a request to the DHCP server for an address, the DHCP server returns a restricted address to the client for accessing, for example, internet only, a particular server, and the like. Alternatively, the DHCP server could deny the client computer an IP address (S56-S58).

The above process may be custom tailored for an individual customer or user. For example, a sub-net address may only forwarded to the client if the client did not perform a local scan (without the need for a latest virus pattern file), or provided the sub-net address if a local scan was conducted but not with a latest virus pattern file, or any other combination of latest virus software (i.e., virus engine application and virus pattern file).

Thus, the present invention solves the problem of allowing a workstation the ability to get onto a network without proper virus protection and/or upgraded virus pattern files. It is easily scalable, via a directory over a distributed environment and may perform the virus scan prior to boot.

Accordingly, the following are examples of particular customers in which the present invention is aptly used.

Example 1

An engineering firm whose users are far more sophisticated than an average computer operator using the Windows operating software.

The Information-Technology (IT) Department of the engineering firm has responsibility to ensure that the latest virus pattern files are on each client of their LAN. In addition, the IT department must insure that a virus engine has scanned each client computer at least once within the last 5 days. If a client has not been scanned in that time period, or the latest virus pattern file is not present in the client, IT department has the right (under internal guidelines) to update that workstation's program files and/or virus pattern data as the client boots. Thus, according to the present invention, this process occurs at pre-boot or boot up stages, checking to see the last virus scan date and time, along with the current pattern file's date/version information. If the virus engine has not run in the last 5 days, or if the pattern files are not current compared to the versions available on the image server (which can be the PXE server), then the image server deploys and installs the program and/or pattern file image(s) to the workstation. This happens during the PXE boot process and prior to the workstation's disk boot up process. This will insure that the virus program will run at boot.

Example 2

A Bank

A bank is an institution that must be at the highest security. Accordingly, the internal policies of such an institutions state that if a client has not been scanned in the last 4 days. The PXE server then installs the program and/or pattern file image(s) during the PXE process, prior to the workstation's disk boot up process. This will insure that the virus program will run at boot. then the DHCP server denies an address. Therefore, the machine cannot communicate to other devices. At this point, a client application detects the internet is not available and scans the system with the virus engine (installed at bootup during the PXE check), and reboots.

Example 3

One company's IT policy allows external access to those without the latest virus data/engines. Specifically, if the PXE virus check is unsuccessful (i.e. the machine does not have the latest pattern files, or has not been scanned in a predetermined period of time), then the DHCP server grants access to a subnet that is not routed internally within the company. In effect, this user is allowed access to the internet, but cannot communicate with any company owned resources (except their externally available resources).

Having now described a few embodiments of the invention, it should be apparent to those skilled in the art that the foregoing is merely illustrative and not limiting, having been presented by way of example only. Numerous modifications and other embodiments are within the scope of ordinary skill in the art and are contemplated as falling within the scope of the invention as defined by the appended claims and equivalents thereto. The contents of all references, issued patents, and published patent applications cited throughout this application are hereby incorporated by reference. The appropriate components, processes, and methods of those patents, applications and other documents may be selected for the present invention and embodiments thereof.

What is claimed is:

1. A method for ensuring that a client computer has up-to-date virus protection by accessing a server for a latest virus file prior to booting a disk image on the client computer, the method comprising:

receiving, during a pre-boot process of the client computer, an access request from the client computer for a latest virus file resident on a server, the server:

i) determining whether the client computer includes the latest virus file; and ii) forwarding to the client computer the latest virus file if the client computer does not include the latest virus file;

receiving from the server and storing the latest virus file at the client computer;

running a local virus scan at the client computer using the latest virus file;

subsequently booting the disk image on the client computer in accordance with the disk image boot up process, and wherein the disk image boot up process includes the server:

determining whether the client computer has performed the local virus scan using the latest virus file; and providing notification for granting the client computer network access based on determination that the client computer has performed the local virus scan using the latest virus file.

2. The method according to claim 1, wherein the latest virus file is at least one of the group selected from: a virus engine application and a virus pattern file.

3. The method according to claim 1, wherein upon the determination that the client computer has performed the local scan for viruses using the latest virus file, the server provides notification to a DHCP server for approving the forwarding of a net address to the client computer upon an address request by the client computer.

4. The method according to claim 3, further comprising forwarding a net address from the DHCP server to the client computer, wherein the net address allows the client computer to access the network.

5. The method according to claim 3, wherein network access by the client computer is denied based on the determination that the client computer has not performed a local scan using the latest virus file.

6. The method according to claim 1, wherein network access by the client computer is denied based on the determination that the client computer has not performed a local scan using the latest virus file.

7. The method according to claim 1, wherein upon the determination that the client computer has not performed the local scan using the latest virus file, the server forwards an alternate boot image to the client computer.

8. The method according to claim 7, wherein the alternate boot image comprises a partial boot image which includes instructions for booting the client computer to provide a browser to the client computer with access to a specified web server.

9. The method according to claim 8, wherein the specified web server transmits virus software to the client computer.

10. The method according to claim 9, wherein upon a transmission of the virus software, the client computer is re-booted to scan for viruses using the virus software.

11. The method according to claim 1, wherein upon the determination that the client has not performed the local scan using the latest virus file, the server provides notification to a DHCP server to deny a net address to the client computer upon a net address request by the client computer.

12. The method according to claim 11, further comprising forwarding a sub-net address from the DHCP server to the client computer upon being denied the net address, based on request from the client computer.

13. The method according to claim 12, wherein the sub-net address allows the client computer to access limited resources selected from the group consisting of: the internet only and a specified web server only.

14. The method according to claim 1, wherein the client computer is booted from a network via a connection protocol.

15. The method according to claim 14, wherein the connection protocol is TCP/IP.

16. The method according to claim 1, wherein upon determination that the client computer does not include the latest virus file during the pre-boot process, the server notifies a DHCP server to grant a restricted sub-net address to the client computer, the restricted sub-net address allowing access to a virus software server to obtain the latest virus file.

17. The method according to claim 1, wherein the network access is granted to a local area network.

18. A computer program product for assuring that a client computer has up-to-date virus protection by accessing a server for a latest virus file prior to booting a disk image on the client computer, the computer program product embodied in a non-transitory computer readable media comprising computer instructions for:
  receiving, during a pre-boot process of the client computer, an access request from the client computer for a latest virus file resident on a server, the server:
    i) determining whether the client computer includes the latest virus file; and
    ii) forwarding to the client computer the latest virus file if the client computer does not include the latest virus file;
  receiving from the server and storing the latest virus file at the client computer;
  running a local virus scan at the client computer using the latest virus file;
  subsequently booting the disk image on the client computer in accordance with the disk image boot up process, and wherein the disk image boot up process includes the server:
    determining whether the client computer has performed the local virus scan using the latest virus file; and
    providing notification for granting the client computer network access based on determination that the client computer has performed the local virus scan using the latest virus file.

19. The computer program product according to claim 18, wherein the computer instructions also include instructions for denying network access by the client computer based on the determination that the client computer has not performed a local scan using the latest virus file.

20. The computer program product according to claim 18, wherein upon the determination that the client computer has not performed the local scan using the latest virus file, the computer instructions also include instructions for forwarding an alternate boot image from the server to the client computer.

21. The computer program product according to claim 18, wherein upon a determination that the client computer has not performed the local scan using the latest virus file, the computer instructions also include instructions for providing notification to a DHCP server to deny a net address to the client computer upon a request by the client.

22. The computer program product according to claim 18, wherein upon the determination that the client computer does not include the latest virus file during the pre-boot process, the computer instructions further include the server notifying a DHCP server to grant a restricted sub-net address to the client computer, the restricted sub-net address allowing access to a virus software server to obtain the latest virus file.

23. The computer program product according to claim 18, further comprising computer instructions for booting the client computer from a network via a connection protocol.

24. The computer program product according to claim 18, wherein upon the determination that the client computer has performed the local scan using the latest virus file, the computer instructions also include providing notification to a DHCP server for approving the forwarding of a net address to the client computer upon an address request by the client computer.

25. The computer program product according to claim 24, further comprising computer instructions for forwarding a net address from the DHCP server to the client computer upon such a request, wherein the net address allows the client computer to access the network.

26. The computer program product according to claim 24, wherein the computer instructions further include instructions for denying network access by the client computer based on the determination that the client computer has not performed a local scan using the latest virus file.

27. A system for ensuring that a client computer has up-to-date virus protection prior to booting a disk image on the client computer, the system comprising:
  a server in communication with the client computer, wherein the server includes:
    computer receiving code for receiving, from the client computer during a pre-boot process of the client computer, an access request for a latest virus file resident on the server;
    first computer determining code for determining whether the client computer includes the latest virus file; and
    computer forwarding code for forwarding to the client computer the latest virus file if the client does not include the latest virus file; and
  a non-transitory computer readable media coupled to the client computer, wherein the non-transitory computer readable media coupled to the client computer includes:
    computer receiving code for receiving the latest virus file from the server and storing the latest virus file at the client computer;
    computer running code for running a local virus scan at the client computer using the latest virus file;
    computer booting code for subsequently booting the disk image on the client computer in accordance with the disk image boot up process, wherein for the disk image boot up process, the server further includes:
      second computer determining code for determining whether the client computer has performed the local virus scan using the latest virus file; and
      computer notifying code for providing notification for granting the client computer network access based on determination that the client computer has performed the local virus scan using the latest virus file.

28. The system according to claim 27, wherein the computer notifying code provides notification to a DHCP server to approve or disapprove the forwarding of a net address to the client computer upon an address request by the client.

29. The system according to claim 27, wherein the computer booting code comprises computer instructions for booting the client computer from a network via a connection protocol.

30. The system according to claim 29, wherein the connection protocol is TCP/IP.

31. The system according to claim 27, wherein the network access is granted to a local area network.

* * * * *